(12) United States Patent
Hansel et al.

(10) Patent No.: US 7,780,137 B2
(45) Date of Patent: Aug. 24, 2010

(54) DEVICE FOR FASTENING A RECTANGULAR SENSOR TO A SUPPORT PART

(75) Inventors: Mathias Hansel, Rummingen (DE); Thomas Eckert, Bad Sackingen (DE); Axel Rhein, Steinen (DE); Laurent Chouvet, Neuenburg (DE)

(73) Assignee: A. Raymond et Cie, Grenoble (FR)

( * ) Notice: Subject to any disclaimer, the term of this patent is extended or adjusted under 35 U.S.C. 154(b) by 0 days.

(21) Appl. No.: 12/299,974

(22) PCT Filed: Jun. 28, 2007

(86) PCT No.: PCT/EP2007/005703

§ 371 (c)(1),
(2), (4) Date: Nov. 7, 2008

(87) PCT Pub. No.: WO2008/009342

PCT Pub. Date: Jan. 24, 2008

(65) Prior Publication Data

US 2009/0146031 A1    Jun. 11, 2009

(30) Foreign Application Priority Data

Jul. 20, 2006    (DE) ................ 10 2006 033 642

(51) Int. Cl.
*A47B 91/00* (2006.01)
(52) U.S. Cl. .............. 248/346.01; 248/346.03
(58) Field of Classification Search ........... 248/346.01, 248/346.03, 346.04, 500, 309.1
See application file for complete search history.

(56) References Cited

U.S. PATENT DOCUMENTS

| | | | | | |
|---|---|---|---|---|---|
| 2,060,543 | A | * | 11/1936 | White | 248/346.04 |
| 5,478,037 | A | * | 12/1995 | Haltof | 248/221.11 |
| 5,480,115 | A | * | 1/1996 | Haltof | 248/221.11 |
| 5,996,956 | A | * | 12/1999 | Shawver | 248/309.1 |
| 6,554,239 | B2 | * | 4/2003 | Stilley et al. | 248/309.1 |
| 6,626,362 | B1 | * | 9/2003 | Steiner et al. | 235/462.45 |

(Continued)

FOREIGN PATENT DOCUMENTS

DE    7229433 U    11/1972

(Continued)

*Primary Examiner*—Amy J. Sterling
(74) *Attorney, Agent, or Firm*—Baker & Daniels LLP

(57) ABSTRACT

A device for fastening a rectangular sensor to a support part has a base plate (2) in which a receiving recess (3) is made. Guide walls (6, 7) are integrally formed on mutually opposite edge sides (4, 5) of the receiving recess (3), said guide walls extending between two corner regions (18, 20; 19, 21) of the receiving recess (3), which corner regions end an edge side (4, 5). Furthermore, stop parts (10, 11) which are shorter than the length of the guide walls (6, 7) are integrally formed on the other edge sides (8, 9), in each case in the central region thereof, the stop parts each having at least one stop section (26) oriented at right angles to the base plate (2), wherein the guide sections (22) and the stop sections (26) bear against a wall of the sensor when the sensor is fitted. As a result, even sensors of relatively large dimensions can be fastened to the support part in a stable and accurately fitting manner with relatively little expenditure on material.

12 Claims, 2 Drawing Sheets

U.S. PATENT DOCUMENTS

| | | |
|---|---|---|
| 6,894,619 B1 | 5/2005 | Schmitt et al. |
| 7,147,163 B2 * | 12/2006 | Salvato et al. .......... 235/472.02 |
| 7,441,744 B2 * | 10/2008 | Chen et al. ................... 248/694 |
| 7,551,458 B2 * | 6/2009 | Carnevali .................... 361/807 |
| 2007/0205348 A1 | 9/2007 | Schmitt et al. |
| 2009/0230161 A1 * | 9/2009 | Emsky ....................... 224/257 |

FOREIGN PATENT DOCUMENTS

| | | |
|---|---|---|
| DE | 102004062466 A1 | 9/2005 |
| WO | WO01/05636 A1 | 1/2001 |
| WO | WO2005/095168 A1 | 10/2005 |

* cited by examiner

DEVICE FOR FASTENING A RECTANGULAR SENSOR TO A SUPPORT PART

CROSS-REFERENCE TO RELATED APPLICATION

This application is a U.S. National Phase Patent Application based on International Application Ser. No. PCT/EP2007/005703 filed Jun. 28, 2007, the disclosure of which is hereby explicitly incorporated by reference herein.

BACKGROUND OF THE INVENTION

1. Field of the Invention

The present invention relates to a device for fastening a rectangular sensor to a support part.

2. Description of the Related Art

One known device for fastening a rectangular sensor to a support part is disclosed in DE 199 33 640 A1, in which the sensor can be fastened to a base plate, on which the stay parts are integrally formed, by means of clip parts, which act together with studs fashioned on the stay parts, the base plate in turn being fastenable to a support part. This device, however, is relatively complex in construction.

DE 103 26 853 A1 discloses a device for fastening a circular sensor to a support part, which exhibits a base plate, on which a circular guide wall surrounds a circular receiving recess. Catch projections which protrude outward radially are fashioned on the guide wall, engaging with a clip part, which spans a sensor having a circular cross section which is inserted in the receiving recess and sits in contact with the guide wall. This device, however, is designed with relatively high material expenditure, which manifests itself as costly, particularly in the case of large sensors with a large circumference.

SUMMARY OF THE INVENTION

The present invention provides a device for fastening a rectangular sensor to a support part, with which even relatively large-dimension sensors can be fastened with a relatively low expenditure on materials in a stable and accurately fitting manner.

Because the device according to the invention exhibits long guide walls, and stop parts that are shorter compared to the guide walls, a reliable fastening of the sensor is ensured with relatively low expenditure on materials.

In one form thereof, the present invention provides a device for fastening a rectangular sensor to a support part with a base plate, having a rectangular or square receiving recess in the base plate with edge sides which, spaced apart from one another, run parallel to one another, with guide walls integrally formed on opposite edge sides of the receiving recess, with at least a guide section aligned perpendicular to the base plate, extending between two corner regions of the receiving recess closing off an edge side, and with shorter stop parts compared to the length of the guide walls integrally formed on the other edge sides in the center region, which each exhibit at least one stop section aligned perpendicular to the base plate, the guide sections and the stop sections sitting in contact with a wall of the sensor when the sensor is inserted.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
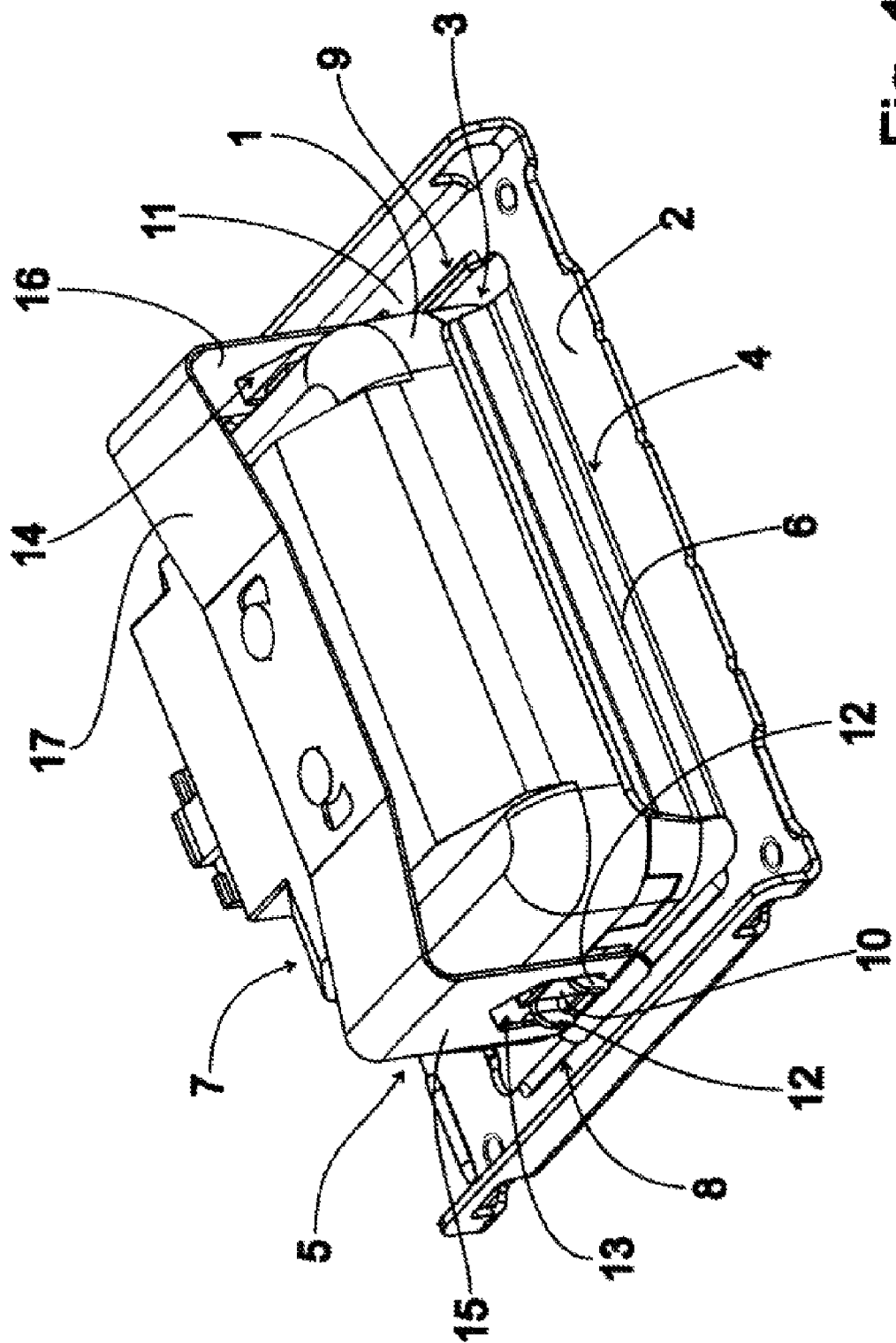
FIG. 1 is a perspective view of an exemplary embodiment of a device according to the invention with an inserted sensor.

Corresponding reference characters indicate corresponding parts throughout the several views. Although the exemplifications set out herein illustrate an embodiment of the invention, the embodiment disclosed below is not intended to be exhaustive or to be construed as limiting the scope of the invention to the precise form disclosed.

DETAILED DESCRIPTION

FIG. 1 shows a perspective view of an exemplary embodiment of a device according to the invention for fastening a rectangular sensor 1 to a support part fashioned as a fastening cage, not depicted in FIG. 1. The device according to the invention as depicted in FIG. 1, preferably made from sheet metal, has a rectangular base plate 2 coated with a hot-melt type adhesive, in the center of which a likewise rectangular receiving recess 3 is fashioned. On the long edge sides 4, 5 of the receiving recess 3, situated opposite one another, guide walls 6, 7 are fashioned, which extend in a direction pointing away from the base plate 2 and sit in contact with a long wall of the sensor 1.

On the short edge sides 8, 9 of the receiving recess 3, stop parts 10, 11 are fashioned in the center, which extend in the same direction as the guide walls 6, 7, pointing away from the base plate 2. On the stop parts 10, 11, projecting away from the receiving recess 3, nose sections 12 are fashioned, which reach through engagement recesses 13, 14, which are introduced in leg parts 15, 16 of an essentially U-shaped tension clip 17, fastened to and spanning the sensor 1.

In a useful characteristic, the nose sections 12 on the stop parts 10, 11 exhibit a different spacing and the widths of the engagement recesses 13, 14 are correspondingly different as well, so that an indexing is created with respect to the alignment of the sensor 1 regarding the device according to the invention.

Figure 2:
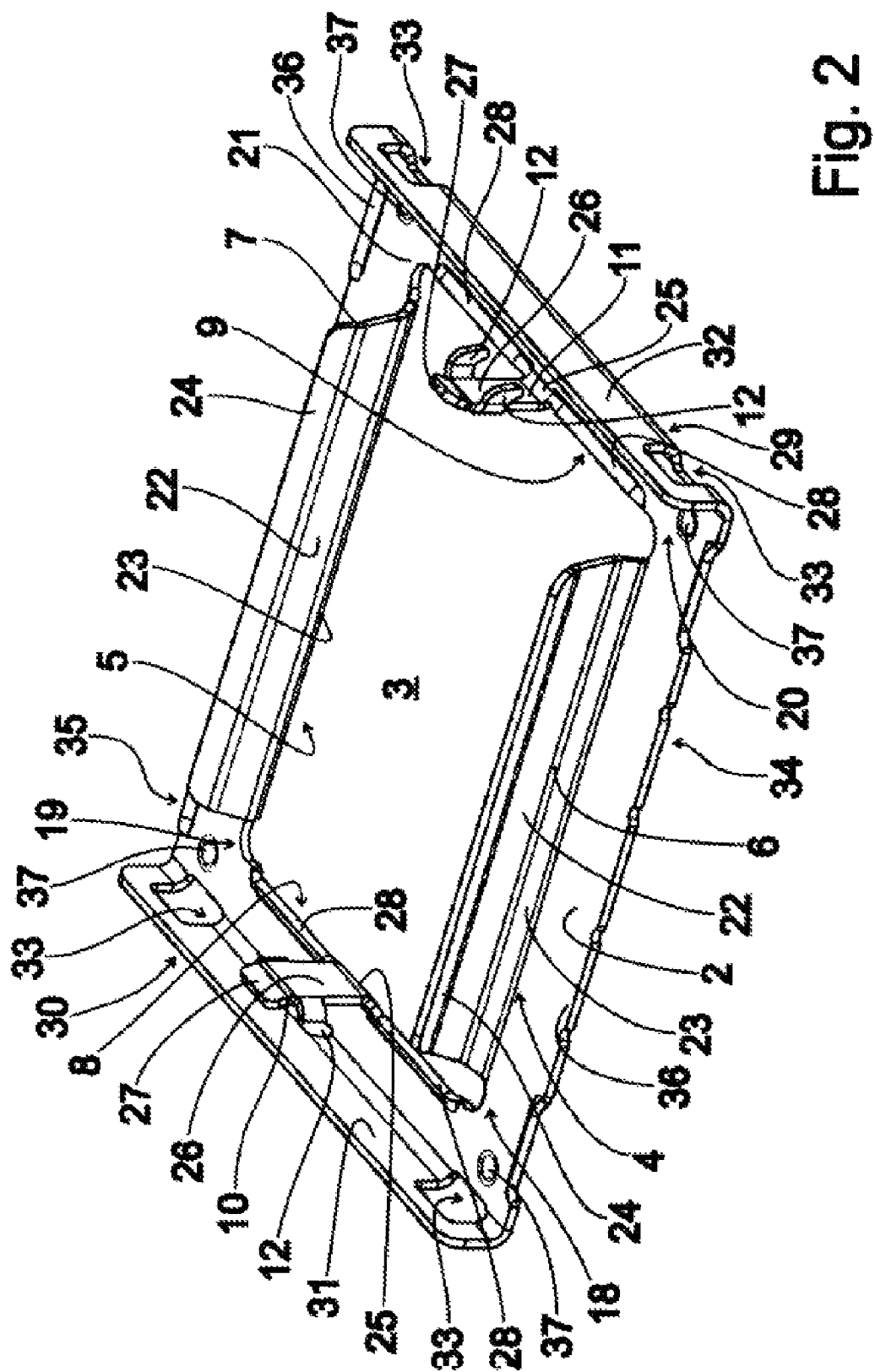
FIG. 2 is a perspective view of the exemplary embodiment according to FIG. 1 seen in the sensor's direction of insertion on a receiving recess, made in a base plate, receiving the sensor.

FIG. 2 shows a perspective view of the exemplary embodiment according to the invention as depicted in FIG. 1. It can be seen from FIG. 2 that the guide walls 6, 7 essentially extend over the entire length of the long edge sides 4, 5 from a corner region 18, 19 into the opposite corner region 20, 21, in which the respective long edge sides 4, 5 end. Each guide wall 6, 7 exhibits, for a certain flexibility, a flat guide section 22, aligned essentially perpendicular to the base plate 2, which is connected with the base plate 2 by means of a positioning section 23. The positioning sections 23 extend diagonally from the base plate 2 in the direction of the stop parts 10, 11 so that the guide sections 22 are displaced inward with respect to the long edge sides 4, 5. This prevents the hot-melt adhesive from overflowing into the receiving recess 3 and reaching the sensor 1.

On the sides of the guide sections 22 located opposite the positioning sections 23, the guide walls 6, 7 each exhibit a center section 24 positioned pointing diagonally outward, away from the receiving recess, in order to facilitate the introduction of the sensor 1 between the guide sections 22, which secure against twisting by the surface contact with the sensor 1.

The significantly shorter stop parts 10, 11, arranged in the middle of the short edge sides 8, 9, saving material compared to the length of the short edge sides 8, 9 and thus also compared to the length of the guide walls 6, 7, are, like the guide walls 6, 7, designed with a positioning section 25 integrally formed on the base plate 2, a stop section 26 extending essentially perpendicular to the base plate 2, and a center section 27. It can also be seen from FIG. 2 that the nose sections 12 are integrally formed on the stop sections 26 as flat tongues and are bent pointing away from the receiving recess 3.

On both sides of the stop parts 10, 11, inner edge positions 28 are fashioned on the short edge sides 8, 9, which are positioned pointing away from the base plate 2 in the direction of the stop parts 10, 11. The inner edge positions 28 each extend from the respective stop part 10, 11 into their adjacent corner area 18, 19, 20, 21. The inner edge positions 28 serve to reinforce the base plate 2.

Reinforcement walls 31, 32 are integrally formed on the short outer sides 29, 30 of the base plate 2 located opposite the short edge sides 8, 9, extending perpendicular to the base plate 2 and parallel to the stop parts 10, 11, serving to stabilize the base plate 2 by means of grip recesses 33 to aid in handling the base plate 2 with a gripping tool not shown in FIG. 2 and for clipping a cover not shown in FIG. 2.

Outer edge positions 36 are fashioned on the long outer sides 34, 35 of the base plate 2 located opposite the long edge sides 4, 5 for reinforcement, like the inner edge positions 28.

The combination of the reinforcing walls 31, 32 and the edge positions 28, 36 brings about a considerable stabilization of the device according to the invention, particularly with respect to twisting, so that to fasten the device according to the invention to the support part, material-saving hot-melt adhesive must only be applied between the long outer sides 34, 35 and the long edge sides 4, 5.

When using a hot-melt adhesive to fasten the base plate 2 to the support part, in order to achieve a defined spacing as well as a defined flow behavior of the hot-melt adhesive, beads 37 are formed in the corner regions 18, 19, 20, 21 of the base plate 2, which project over the side of the base plate 2 located opposite the guide walls 6, 7 and the stop parts 10, 11.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A device for fastening a rectangular sensor to a support part, said device comprising:
    a base plate having a recess with one of a rectangular shape and a square shape, and two pairs of edge sides spaced apart from one another and disposed parallel to one another;
    guide walls integrally formed on opposite respective edge sides of said receiving recess, each guide wall including a guide section aligned perpendicular to said base plate and extending between respective corner regions of said receiving recess and at least partially closing off a respective edge side; and
    stop parts integrally formed on the other respective edge sides in center regions thereof, said stop parts each including at least one stop section aligned perpendicular to said base plate, said guide sections and said stop sections each adapted to engage a wall of a sensor when the sensor is inserted into said device; and
    wherein each guide wall includes a center section disposed on a side of said guide section opposite said base plate and disposed at an angle extending away from said receiving recess.

2. A device for fastening a rectangular sensor to a support part, said device comprising:
    a base plate having a recess with one of a rectangular shape and a square shape, and two pairs of edge sides spaced apart from one another and disposed parallel to one another;
    guide walls integrally formed on opposite respective edge sides of said receiving recess, each guide wall including a guide section aligned perpendicular to said base plate and extending between respective corner regions of said receiving recess and at least partially closing off a respective edge side; and
    stop parts integrally formed on the other respective edge sides in center regions thereof, said stop parts each including at least one stop section aligned perpendicular to said base plate, said guide sections and said stop sections each adapted to engage a wall of a sensor when the sensor is inserted into said device; and
    wherein each guide wall includes a positioning section connecting said guide section and said base plate, and extending diagonally away from its respective edge side of said base plate in a direction of said guide section.

3. The device of claim 1, wherein each stop part includes at least one nose section extending in a direction away from said receiving recess.

4. The device of claim 1, further comprising reinforcing walls integrally formed on said edge sides of said receiving recess and disposed opposite one another on external outer sides of said base plate, said receiving walls including stop parts disposed perpendicular to said base plate.

5. The device of claim 1, further comprising inner edge positions integrally formed on said edge sides and disposed laterally with respect to said stop parts.

6. The device of claim 1, further comprising outer edge positions integrally formed on external sides of said base plate, said outer edge positions located opposite said edge sides that include said guide walls.

7. The device of claim 1, wherein said receiving recess is rectangular in shape, and said guide walls are disposed on relatively longer edge sides and said stop parts are disposed on relatively shorter edge sides.

8. The device of claim 2, wherein each stop part includes at least one nose section extending in a direction away from said receiving recess.

9. The device of claim 2, further comprising reinforcing walls integrally formed on said edge sides of said receiving recess and disposed opposite one another on external outer sides of said base plate, said receiving walls including stop parts disposed perpendicular to said base plate.

10. The device of claim 2, further comprising inner edge positions integrally formed on said edge sides and disposed laterally with respect to said stop parts.

11. The device of claim 2, further comprising outer edge positions integrally formed on external sides of said base plate, said outer edge positions located opposite said edge sides that include said guide walls.

12. The device of claim 2, wherein said receiving recess is rectangular in shape, and said guide walls are disposed on relatively longer edge sides and said stop parts are disposed on relatively shorter edge sides.

* * * * *